United States Patent [19]

Lumpkin et al.

[11] 4,146,359

[45] Mar. 27, 1979

[54] METHOD FOR REACTING NONGASEOUS MATERIAL WITH A GASEOUS REACTANT

[75] Inventors: Robert E. Lumpkin, Claremont, Calif.; Kandaswamy Duraiswamy, Sterling, Va.

[73] Assignee: Occidental Petroleum Corporation, Los Angeles, Calif.

[21] Appl. No.: 700,005

[22] Filed: Jun. 25, 1976

[51] Int. Cl.$^2$ .................. F27B 15/00; C10B 49/12; C10J 3/68; B01D 45/12

[52] U.S. Cl. .................................. 432/14; 48/76; 48/203; 55/261; 55/419; 55/459 R; 110/244; 110/264; 201/37; 202/108; 202/121; 432/659; 431/10; 431/173; 431/352; 432/16; 432/58; 422/232

[58] Field of Search ............... 201/16, 28, 37, 15; 202/108, 121, 91, 92, 93; 48/203, 76; 423/659; 55/261, 419, 459 R; 261/79 A U.S. only; 110/28 F, 244, 264; 432/14, 16, 58; 23/277 R, 284

[56] References Cited

U.S. PATENT DOCUMENTS

| | | | |
|---|---|---|---|
| 2,413,407 | 12/1946 | Dreyfus | 23/284 UX |
| 2,655,443 | 10/1953 | Moore | 48/206 |
| 2,694,623 | 11/1954 | Welty, Jr. et al. | 48/197 R |
| 2,707,444 | 5/1955 | Van Loon | 110/28 F |
| 3,047,371 | 7/1962 | Krause et al. | 23/284 X |
| 3,064,811 | 11/1962 | Mumper | 55/459 R X |
| 3,213,015 | 10/1965 | Atkinson et al. | 23/277 R X |
| 3,541,003 | 11/1970 | Carr et al. | 423/659 X |
| 3,597,141 | 8/1971 | Fracke et al. | 110/28 F X |
| 3,636,682 | 1/1972 | Rush | 55/459 R |
| 3,727,562 | 4/1973 | Bauer | 110/28 F X |
| 3,847,571 | 11/1974 | Cole, Jr. | 55/459 R X |
| 3,876,392 | 4/1975 | Kolina et al. | 48/210 |
| 3,891,402 | 6/1975 | Nahas et al. | 48/197 R |

FOREIGN PATENT DOCUMENTS

520801 1/1956 Canada.

Primary Examiner—Joseph Scovronek
Attorney, Agent, or Firm—Forrest E. Logan

[57] ABSTRACT

This invention relates to a new and novel method and apparatus for reacting nongaseous material with a gaseous reactant comprising introducing a first stream containing a nongaseous material into a reaction zone; simultaneously introducing a second stream containing a gaseous reactant into the reaction zone such that the gaseous reactant immediately contacts and reacts with the first stream thereby producing a gaseous product; forming a spiralling vortex within the reaction zone to cause substantial separation of gases, including the gaseous product, from the nongaseous material; forming and removing a third stream from the reaction zone containing the gaseous product which is substantially free of the nongaseous material before a major portion of the gaseous product can react with the nongaseous material; and forming and removing a fourth stream containing the nongaseous material from the reaction zone.

25 Claims, 7 Drawing Figures

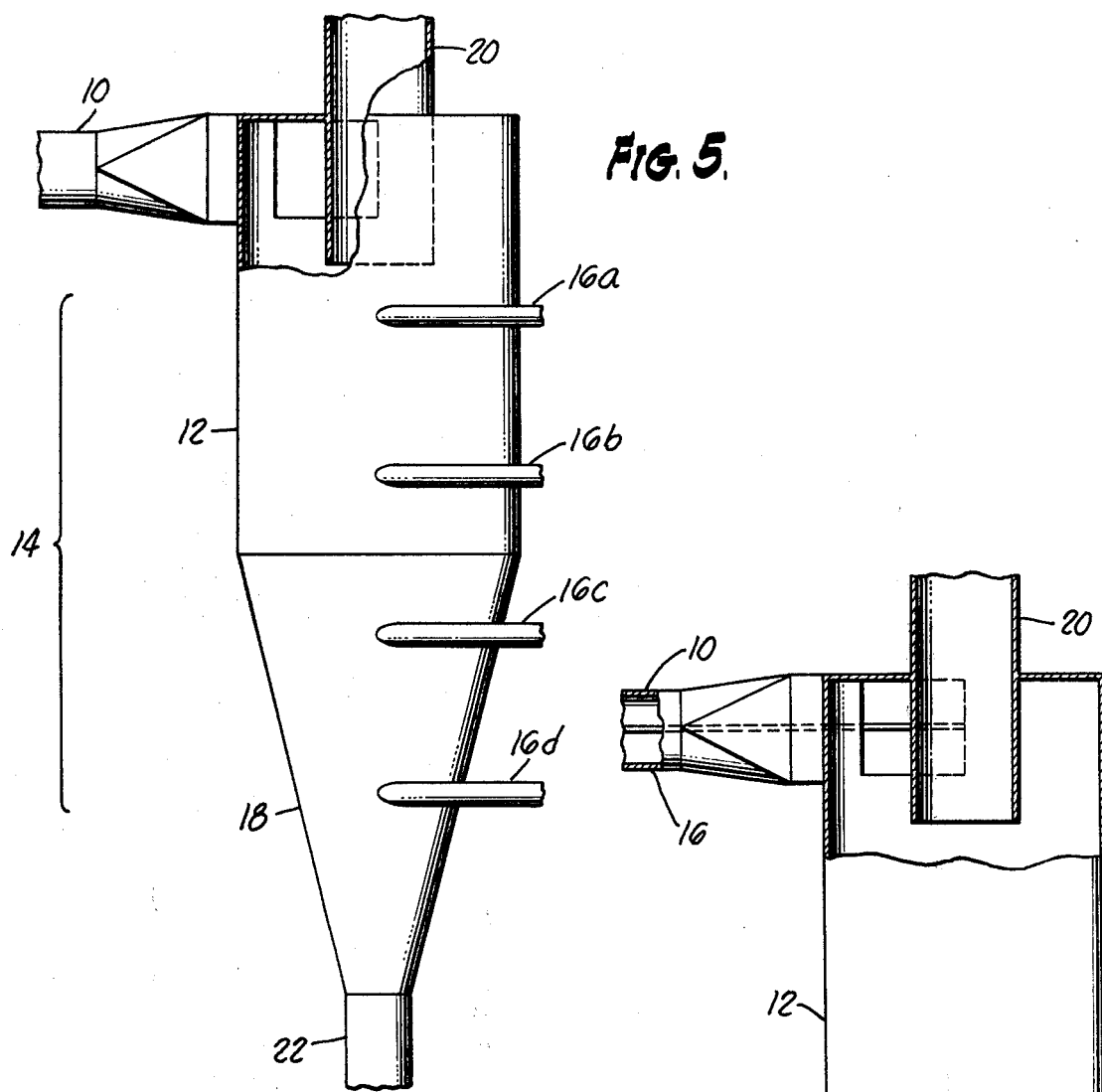
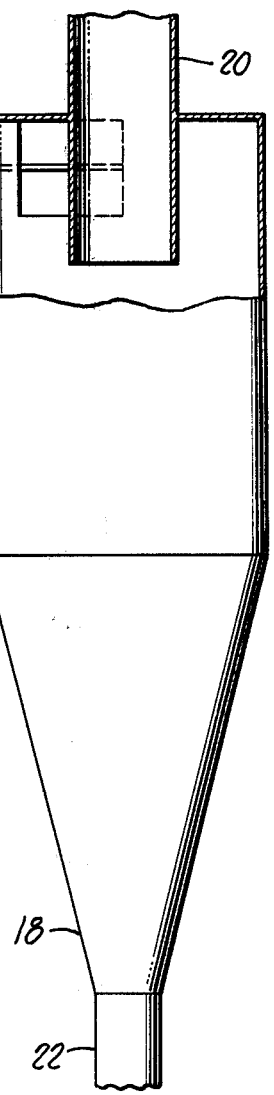
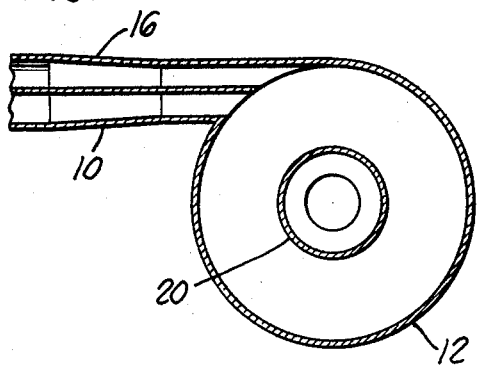

METHOD FOR REACTING NONGASEOUS MATERIAL WITH A GASEOUS REACTANT

The Government has rights in or in respect of this invention pursuant to Contract No. E(49-18)-2244 awarded by the U.S. Energy Research and Development Administration.

BACKGROUND OF THE INVENTION

In many processes there is involved the step of reacting a nongaseous material with a gaseous reactant to a produce gaseous product. In some reactions it is desirable to prevent the gaseous product from reacting with residual nongaseous material. This invention relates to an apparatus and method for reacting nongaseous material with a gaseous reactant and removing the gaseous product from the reaction zone before the gaseous product can react with nongaseous material.

For example, in many carbonization processes there is involved the step of heating nongaseous carbonaceous material by partial oxidation of a portion of the nongaseous carbonaceous material to produce a gaseous product containing carbon dioxide and gaseous $H_2O$. The partial oxidation is for purposes of heating the nongaseous carbonaceous material to a higher temperature for recirculation to the carbonization zone as a heat-supplying medium. In such processes it is desirable to minimize the reactions of carbon dioxide and gaseous $H_2O$ with the nongaseous carbonaceous material, which produce carbon monoxide, because such reactions are endothermic and their occurrence will reduce the overall thermal efficiency. In order to minimize these reaction it is necessary that the gaseous products, carbon dioxide and gaseous $H_2O$, be immediately removed from the reaction zone.

This invention relates to a process for heating nongaseous carbonaceous material by partial oxidation of a portion thereof to release thermal energy which remains substantially with the residual portion thereof so as to produce a heat-supplying medium.

This invention also relates to an apparatus for heating nongaseous carbonaceous material by partial oxidation of a portion thereof to release thermal energy which remains substantially with the residual nongaseous carbonaceous material, and for the immediate separating of the gaseous product from the nongaseous carbonaceous material.

In the past, processes involving a heating of nongaseous carbonaceous material by partial oxidation have suffered a loss of thermal efficiency caused by the reaction of the gaseous product, which contains carbon dioxide and possibly gaseous $H_2O$, with the nongaseous carbonaceous material to produce carbon monoxide. Because the formation of the carbon monoxide from the reaction of the gaseous product comprising carbon dioxide and possibly $H_2O$ with the carbon content of the remaining nongaseous carbonaceous material is endothermic, useful heat is lost from the system.

Processes have been used in the past to reclaim some of the lost heat by burning the carbon monoxide. Although some heat may be recovered, the transfer of the heat released to the remaining nongaseous carbonaceous materials is not as efficient as the process of this invention which prevents the formation of carbon monoxide from the residual carbonaceous material.

Processes which employ the heating of nongaseous carbonaceous material by partial oxidation of a portion of the nongaseous carbonaceous materials are, for example, employed in pyrolysis processes. In many such processes, nongaseous carbonaceous material is employed as a heating medium by mixing the hot nongaseous carbonaceous material in direct heat transfer relationship with fresh nongaseous carbonaceous material to be pyrolyzed. High heat transfer rates are achieved by intimate contacting of the fresh feed material with heated char so that low residence times are achieved thereby enhancing the gaseous product yield and quality.

Pyrolysis processes are used to convert particulate carbonaceous materials such as coal, either coking or noncoking type, an agglomerative or nonagglomerative type to a valuable gaseous product and char. The char product often is heated separately by partial oxidation of a portion thereof to raise the remaining portion to a higher temperature. The heated char is then recycled to the pyrolysis zone to supply at least a portion of the heat required for pyrolysis.

Other carbonaceous materials employing the heating of a nongaseous carbonaceous material to a higher temperature to use as a heat-supplying medium are found in the pyrolysis of solid waste materials, such as municipal solid wastes and industrial solid wastes.

SUMMARY OF THE INVENTION

This invention in part covers a process for the reacting of a nongaseous material with a gaseous reactant in such a manner that the gaseous product produced thereby is removed from the system before substantial reaction therewith can occur with the nongaseous material.

This invention also covers an apparatus for such a process.

In particular, this invention in part covers a process for heating nongaseous carbonaceous material to a higher temperature. After heating to a higher temperature the noncarbonaceous material may be utilized as a heat-supplying medium in the pyrolysis of carbonaceous materials.

The invention heats the nongaseous carbonaceous material by partially oxidizing a portion of the nongaseous carbonaceous material to produce thermal energy in a reaction zone. The thermal energy is produced on the surface of the nongaseous carbonaceous material and a substantial part remains therewith, thereby raising its temperature. The remaining nongaseous carbonaceous material is raised in temperature while it is still within the reaction zone and at the same time it is substantially separated from the gaseous product formed therein as a result of the partial oxidation.

The endothermic reactions of the gaseous products, carbon monoxide and gaseous $H_2O$, with the nongaseous carbonaceous material, are substantially minimized by separating the nongaseous carbonaceous material from the gaseous product before a major portion of the gaseous product can react with the nongaseous carbonaceous material. That is, the separation of the gaseous product is made to occur within a period of time sufficiently short that a major portion of the gaseous products does not react with the nongaseous carbonaceous material. The separation of the nongaseous carbonaceous material occurs within the reaction zone thereby providing the brevity of residence time required to prevent an endothermic reaction with the nongaseous carbonaceous material.

In order to achieve the brevity of residence time, the gaseous reactant must be introduced to the reaction zone in such a manner that it immediately contacts and reacts with a first stream containing the nongaseous material. In order to rapidly separate the gaseous product from the nongaseous material a spiralling vortex is formed within the reaction zone thereby causing substantial separation of gases present therein from the nongaseous material present therein. The nongaseous material is caused to form an outer spiralling vortex in the reaction zone while the gases form an inner spiralling vortex, which is substantially free of nongaseous material, and which is quickly removed from the reaction zone along the axis thereof. The nongaseous material is removed simultaneously in a separate stream from the reaction zone.

In the embodiment wherein nongaseous carbonaceous material is partially oxidized within the reaction zone, thermal energy is imparted to the residual nongaseous carbonaceous material as a result of the heat produced by the oxidation process occurring within the reaction zone. It can be appreciated that the thermal efficiency of this process is maximized.

The apparatus for heating nongaseous carbonaceous material is composed of a covered cylindrical chamber having a tangential inlet for directing a stream containing a nongaseous material into the reaction zone. A second means is provided for introducing a second stream containing a gaseous reactant, such as oxygen, into the reaction zone such that the gaseous reactant immediately contacts and reacts with the first stream. A first outlet located in the covered end of the covered cylindrical chamber, and oriented along the axis thereof, provides a means for removing gases which are substantially free of nongaseous material. A second outlet located at the smaller diameter end of the conical portion provides a means for removing nongaseous material.

BRIEF DESCRIPTION OF THE DRAWINGS

The invention, including various novel features will be more fully understood by reference to the accompanying drawings and the following description of the operation of the alternatives illustrated therein:

FIG. 5 is a third embodiment of the invention for treating nongaseous material wherein the gaseous reactant is introduced into the reactor in a plurality of points.

FIG. 6 is a fourth embodiment of the invention.

FIG. 7 is a fifth embodiment of the invention.

DETAILED DESCRIPTION OF PREFERRED EMBODIMENT

Figure 1:
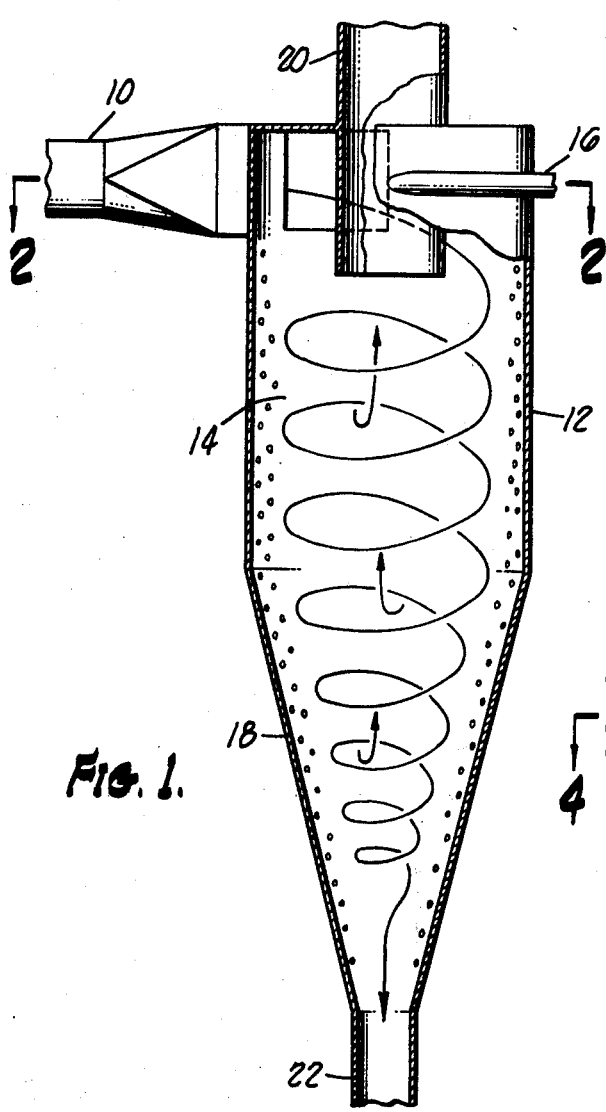
FIG. 1 is a schematic diagram of one embodiment of the invention for treating nongaseous material wherein the inlets are separated and at the same radial distance.

By nongaseous material is meant any material which is a solid or a liquid.

By nongaseous carbonaceous material is meant any material which contains carbon and which is not in the gaseous state.

By oxygen is meant any source of oxygen. The oxygen need not be in the pure state, but may be a part of a stream such that oxygen from the stream is available for the partial oxidation of the nongaseous carbonaceous material. Such oxygen may be a gas mixture which contains therein free oxygen, such as air.

By gaseous product is meant the gases produced from the reaction of the nongaseous carbonaceous material with the gaseous reactant. In the preferred embodiment the nongaseous material is carbonaceous, more preferably particulate, and the gaseous reactant is a stream containing gaseous oxygen.

Referring now to the drawings, nongaseous carbonaceous material from conduit 10 enters reactor 12 containing reaction zone 14. The nongaseous carbonaceous material preferably is particulate. Still more preferably, the nongaseous carbonaceous material is a char produced from the particulate carbonaceous material such as coal char or solid waste char. Still more preferably, the char was produced by pyrolysis of the particulate carbonaceous material.

Preferably the nongaseous carbonaceous material is entrained in a carrier gas as it is introduced into the reactor.

Oxygen is fed continously and simultaneously to the reaction zone 14 through conduit 16, or in the embodiment of FIG. 5 through conduits 16a, 16b, 16c, and 16d. The oxygen may be supplied from any source of oxygen, such as a gas stream containing gaseous oxygen such as air or a flue gas enriched with air or oxygen.

In the embodiment using oxygen, conduits 16 or 16a, 16b, 16c, and 16d are relatively small compared to conduit 10 since only a small amount of oxygen is required to heat the residual nongaseous carbonaceous material.

The oxygen and nongaseous carbonaceous material are caused to spiral inside reactor 12 towards conical portion 18 in such a manner that the nongaseous carbonaceous material is confined along the walls of the reactor while the gases are caused to separate from the nongaseous material and exit the reactor through conduit 20. Residual nongaseous material is urged towards a conduit 22 located at the smaller diameter end of said conical portion 18.

The second stream containing oxygen, entering through conduit 16 or conduits 16a, 16b, 16c, and 16d, is caused to immediately contact and react with the first stream containing the nongaseous carbonaceous material and at the same time undergo substantial separation of the gas from the nongaseous carbonaceous material within the reaction zone.

In all embodiments, the second stream containing oxygen is introduced in such a manner as to not lower substantially the efficiency of separation of the nongaseous material from the gases.

Figure 2:
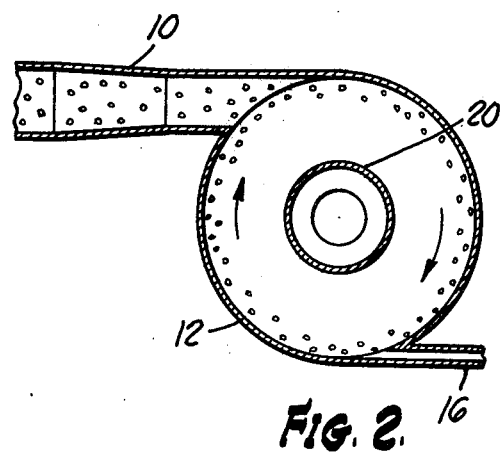
FIG. 2 is the view of the invention in FIG. 1 through the line marked 2—2.

In the embodiment of FIGS. 1 and 2 the point of entry of conduit 10, provided for introducing a stream containing nongaseous carbonaceous material, is removed from the point of entry of conduit 16, provided for introducing a stream containing oxygen.

Figure 3:
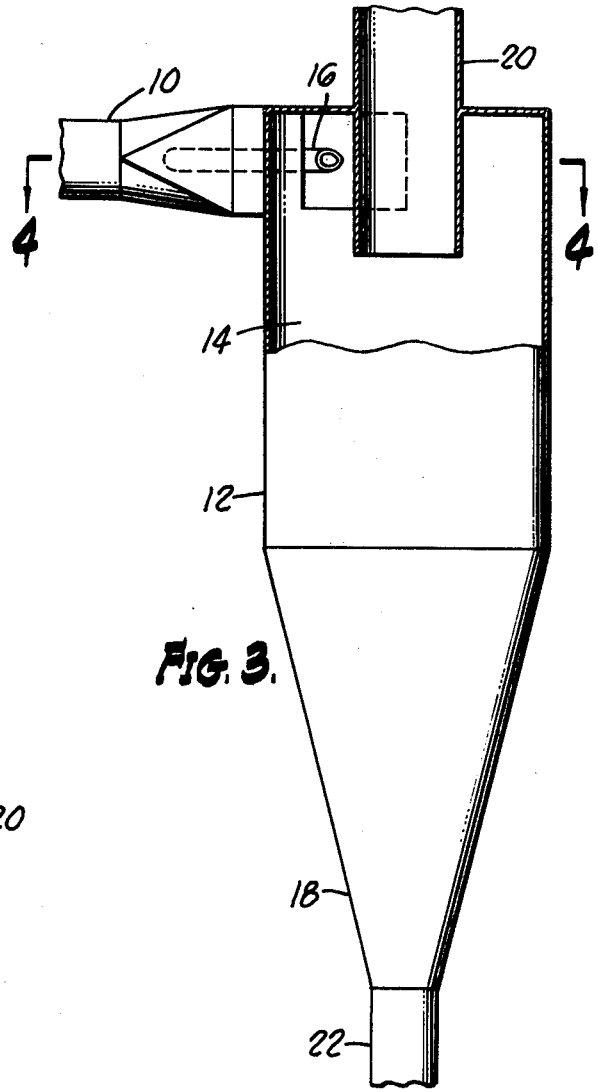
FIG. 3 is an embodiment of the invention for treating nongaseous material wherein the inlet for the nongaseous material is concentric to the inlet for the gaseous reactant.
Figure 4:
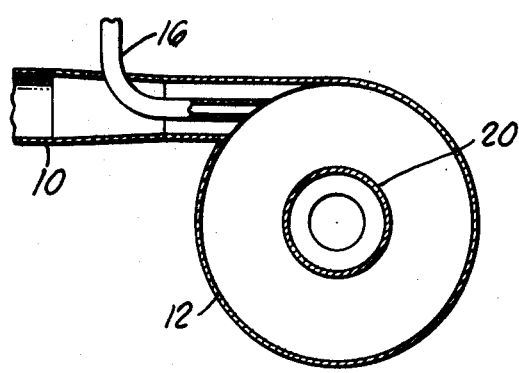
FIG. 4 is the view in FIG. 3 through line 4—4.

In the embodiment shown in FIGS. 3 and 4 the first stream containing the nongaseous particulate material surrounds the second stream containing oxygen as the streams are about to enter the reaction zone. As shown, the conduit 10 is concentric to conduit 16 and near the point of communication with the covered cylindrical chamber.

In the embodiment shown in FIG. 5 the second stream containing oxygen is introduced at a plurality of points within the reaction zone. Entry conduits 16a, 16b, 16c, and 16d, are farther removed from the covered end of covered cylindrical chamber 12 than the entry conduit 10 for the nongaseous carbonaceous material.

Also in the embodiment of FIG. 5, the radial distances of the point of entry of conduits 16c and 16d from the axis of the covered cylindrical reactor are smaller than the similar radial distance for conduit 10. Multiple entry points for the stream containing oxygen enables a better distribution, shorter reaction times, and faster separation of the gases from the nongaseous material within the reaction zone.

Conduit 16 and conduits 16a and 16b are shown with the same radial distance of the point of entry from the axis of the covered cylindrical reactor as conduit 10.

In the preferred embodiment wherein nongaseous carbonaceous material is reacted with oxygen, the gaseous product is separated from the nongaseous carbonaceous material before a major portion of the gaseous product can react with the nongaseous carbonaceous material. In other words, the gaseous product is separated from the nongaseous carbonaceous material within a period of time sufficiently short that the carbon monoxide content of the separated gases removed through conduit 20 is not appreciably greater than the carbon monoxide content of the streams entering the reactor through conduits 10 and 16, or 16a, 16b, 16c, and 16d.

In order to minimize the reaction of the gaseous products with the nongaseous carbonaceous material, separation preferably is made to occur within a period of time of about five seconds and more preferably within a period of time of about one second.

What is meant by a carbon monoxide content of the gas leaving the reaction zone, which is not appreciably greater than the carbon monoxide content of the streams entering the reaction zone, is that the carbon monoxide content of the gas leaving the reaction zone through conduit 20 is no greater than 1.2 times the carbon monoxide content of the streams entering the reactor through conduits 10 and 16 or as in FIGS. 5, 10, 16a, 16b, 16c, and 16d. Still more preferably the carbon monoxide content of the gas leaving the reaction zone is no greater than 1.1 times the carbon monoxide content of the streams entering therein.

In the preferred embodiment another objective is to heat the nongaseous carbonaceous material with oxygen by partial combustion of a portion of the nongaseous carbonaceous material so that the residual nongaseous carbonaceous material is at a higher temperature as it leaves the reaction zone, through conduit 22, than the temperature at which it enters the reaction zone, through conduit 10.

It can be appreciated that the reaction of the gaseous products becomes more favorable for higher temperatures and at higher temperatures the advantages of this efficient process are realized. In the preferred embodiment the carbonaceous material is introduced into the reaction zone at a temperature of about 1300° F. or higher. At this temperature appreciable reaction of the gaseous product with the nongaseous carbonaceous material will occur unless the gaseous product is separated therefrom very rapidly. By appreciable reaction is meant that the carbon monoxide content of the gas leaving the reaction zone, through conduit 10, is greater than 1.2 times the carbon monoxide content of the streams entering the reactor, through conduits 10 and 16.

FIGS. 6 and 7 are alternate embodiment of the invention for introducing the nongaseous carbonaceous material into the reaction zone separate from the stream containing oxygen.

The nature and objects of the invention can be more fully understood by considering the following example.

EXAMPLE

Coal char produced by pyrolysis of coal is introduced into a reactor as shown in FIG. 1 through conduit 10, at a rate of 817 lbs/sec. entrained in a carrier gas at a mixed temperature of 1616° F. The carrier is introduced at a rate of 0.406 pound moles/sec. and is composed of 67.56 mole percent nitrogen, 28.96 mole percent carbon monoxide, and 3.48 mole percent carbon dioxide.

Air is introduced through conduit 16 at a rate of 2.8 pound moles/sec. at a temperature of 1616° F.

The diameter of the reactor is 14 ft. and the height is 50 ft. The average gaseous residence time in the reactor, defined as the volume of the reactor divided by the volumetric flow rate, is about one second.

While we do not wish to be bound by theory, in the above example, it will be appreciated, that the average period of time of contact of the gaseous product with the coal char, is significantly less than one second.

While we have disclosed the preferred embodiment of our invention, it is to be understood that the details thereof may be varied within the scope of the following claims.

What is claimed is:

1. A process for reacting nongaseous material with a gaseous reactant comprising:
   a. introducing a first stream containing a nongaseous material into a reactor comprising:
      i. a reactor structure having a covered cylindrical chamber,
      ii. a conical portion attached to said covered cylindrical chamber opposite the covered end thereof and in communication therewith,
      iii. an inlet for directing a first stream containing a nongaseous material tangentially into said covered cylindrical chamber such that nongaseous material forms a spiralling vortex which is urged towards said conical portion,
      iv. a means for simultaneously introducing a second stream containing a gaseous reactant into said covered cylindrical chamber such that said gaseous reactant immediately contacts said first stream,
      v. a first outlet located in the covered end of said covered cylindrical chamber, and oriented along the axis thereof and in communication therewith for removing gases, and
      vi. a second outlet located at the smaller diameter end of said conical portion and in communication therewith for removing nongaseous material;
   b. simultaneously introducing a second stream containing a gaseous reactant into said reactor through said means thereby causing said gaseous reactant to immediately contact and react with said first stream and thereby producing a gaseous product;
   c. forming a spiralling vortex within said reactor to cause substantial separation of gases including said gaseous product, from said nongaseous material;
   d. forming and removing a third stream which is substantially free of said nongaseous material from said reactor through said first outlet before a major portion of said gaseous product can react with said nongaseous material; and e. forming and removing a fourth stream containing a substantial part of said nongaseous material which is introduced into said reactor in step (a), from said reactor through said second outlet.

2. A process for heating nongaseous carbonaceous material with oxygen comprising:
   a. introducing a first stream containing a nongaseous carbonaceous material into a reactor comprising:
      i. a reactor structure having a covered cylindrical chamber,
      ii. a conical portion attached to said covered cylindrical chamber opposite the covered end thereof and in communication therewith,
      iii. an inlet for directing a first stream containing a nongaseous carbonaceous material tangentially into said covered cylindrical chamber such that nongaseous material forms an outer spiralling vortex which is urged towards said conical portion and such that nongaseous material is substantially separated from gases,
      iv. a means for simultaneously introducing a second stream containing gaseous oxygen into said covered cylindrical chamber such that said gaseous oxygen immediately contacts said first stream and such that said second stream enters said covered cylindrical chamber with the same rotation as said first stream,
      v. a first outlet located in the covered end of said covered cylindrical chamber, and oriented along the axis thereof and in communication therewith, for forming an inner spiralling gaseous vortex and for removing gases substantially separated from nongaseous material, and
      vi. a second outlet located at the smaller diameter end of said conical portion and in communication therewith for removing nongaseous material;
   b. simultaneously introducing a second stream containing oxygen into said reactor through said means thereby causing oxygen to immediately contact and react with said first stream and thereby producing a gaseous product;
   c. forming a spiralling vortex within said reactor to cause substantial separation of gases including said gaseous product, from said nongaseous carbonaceous material;
   d. forming and removing a third stream which is substantially free of said nongaseous carbonaceous material from said reactor through said first outlet before a major portion of said gaseous product can react with said nongaseous carbonaceous material; and
   e. forming and removing a fourth stream containing a substantial part of said nongaseous carbonaceous material which is introduced into said reactor in step (a), from said reactor through said second outlet.

3. A process for heating nongaseous carbonaceous material with oxygen, as recited in claim 2, wherein the point of communication of said inlet with said cylindrical chamber is near the covered end of said covered cylindrical chamber.

4. A process for heating nongaseous carbonaceous material with oxygen, as recited in claim 2, wherein the point of communication of said means with said covered cylindrical chamber is at the same radial distance as said point of communication of said inlet with said covered cylindrical chamber.

5. A process for heating nongaseous carbonaceous material with oxygen, as recited in claim 2, wherein the point of communication of said means with said covered cylindrical chamber is spaced apart from the point of communication of said inlet with said covered cylindrical chamber.

6. A process for heating nongaseous carbonaceous material with oxygen, as recited in claim 2, wherein said means is a conduit and said inlet is a conduit concentric to said means.

7. A process for heating nongaseous carbonaceous material with oxygen, as recited in claim 2, wherein the point of communication of said means with said covered cylindrical chamber is farther removed from the covered end of said covered cylindrical chamber than is the point of communication of said inlet.

8. A process for heating nongaseous carbonaceous material with oxygen, as recited in claim 2, wherein the communication of said means with said covered cylindrical chamber comprises plural inlets which are axially spaced.

9. A process for reacting nongaseous material with a gaseous reactant comprising:
   a. introducing a first stream containing a nongaseous material into a reaction zone;
   b. simultaneously introducing a second stream containing a gaseous reactant into said reaction zone such that said gaseous reactant immediately contacts and reacts with said first stream thereby producing a gaseous product;
   c. forming a spiralling vortex within said reaction zone to cause substantial separation of gases including said gaseous product, from said nongaseous material;
   d. forming and removing a third stream from said reaction zone containing said gaseous product which is substantially free of said nongaseous material before a major portion of said gaseous product can react with said nongaseous material; and
   e. forming and removing a fourth stream containing a substantial part of said nongaseous material which is introduced into said reaction zone in step (a), from said reaction zone.

10. A process for reacting nongaseous material with a gaseous reactant comprising:
    a. introducing tangentially a first stream containing a nongaseous material and a carrier gas into a reaction zone;
    b. simultaneously introducing a second stream containing a gaseous reactant into said reaction zone such that said gaseous reactant immediately contacts and reacts with said first stream thereby producing a gaseous product;
    c. forming a spiralling vortex within said reaction zone to cause substantial separation of gases including said gaseous product and said carrier gas from said nongaseous material;
    d. forming and removing a third stream from said reaction zone containing said gaseous product and said carrier gas which is substantially free of said nongaseous material before a major portion of said gaseous product can react with said nongaseous material; and
    e. forming and removing a fourth stream containing a substantial part of said nongaseous material which is introduced into said reaction zone in step (a), from said reaction zone.

11. A process for reacting nongaseous carbonaceous material with oxygen comprising:
   a. introducing a first stream containing a nongaseous carbonaceous material into a reaction zone;
   b. simultaneously introducing a second stream containing oxygen into said reaction zone such that said oxygen immediately contacts and reacts with said first stream thereby producing a gaseous product;
   c. forming a spiralling vortex within said reaction zone to cause substantial separation of gases, including said gaseous product, from nongaseous carbonaceous material;
   d. forming and removing a third stream from said reaction zone containing said gaseous product which is substantially free of said nongaseous carbonaceous material before a major portion of said gaseous product can react with said nongaseous carbonaceous material; and
   e. forming and removing a fourth stream containing a substantial part of said nongaseous carbonaceous material which is introduced into said reactor in step (a), from said reaction zone.

12. A process for reacting nongaseous carbonaceous material with oxygen, as recited in claim 11, wherein the nongaseous carbonaceous material is at a temperature of about 1300° F. or higher as it is introduced into said reaction zone.

13. A process for reacting nongaseous carbonaceous material with oxygen, as recited in claim 11, wherein said second stream is introduced separately into said reaction zone.

14. A process for reacting nongaseous carbonaceous material with oxygen, as recited in claim 11, wherein said first stream is introduced in an annulus around said second stream.

15. A process for reacting nongaseous carbonaceous material with oxygen, as recited in claim 11, wherein said second stream is introduced into said reaction zone at a plurality of points.

16. A process for reacting nongaseous carbonaceous material with oxygen, as recited in claim 11, wherein said forming and removing of said third stream is within a period of time sufficiently short that the carbon monoxide content of said third stream is no greater than about 1.2 times the carbon monoxide content of said first stream and said second stream.

17. A process for heating particulate carbonaceous material with oxygen comprising:
   a. introducing tangentially a first stream containing a particulate carbonaceous material and a carrier gas into a reaction zone;
   b. simultaneously introducing a second stream containing oxygen into said reaction zone such that said oxygen immediately contacts and reacts with said first stream thereby producing a gaseous product and heating said particulate carbonaceous material;
   c. forming a spiralling vortex within said reaction zone to cause substantial separation of gases, including said gaseous product and said carrier gas, from said particulate carbonaceous material;
   d. forming and removing a third stream from said reaction zone containing said gaseous product and said carrier gas which is substantially free of said particulate carbonaceous material within a period of time sufficiently short that the carbon monoxide content of said third stream is no greater than about the carbon monoxide content of said first and said second streams; and
   e. forming and removing a fourth stream containing a substantial part of said particulate carbonaceous material which is introduced into said reactor in step (a), from said reaction zone.

18. A process for heating particulate carbonaceous material with oxygen, as recited in claim 17, wherein the particulate carbonaceous material is at a temperature of 1300° F. or higher as it is introduced into said reaction zone.

19. A process for heating particulate carbonaceous material with oxygen, as recited in claim 17, wherein said second stream is introduced separately into said reaction zone.

20. A process for heating particulate carbonaceous material with oxygen, as recited in claim 17, wherein said first stream surrounds said second stream.

21. A process for heating particulate carbonaceous material with oxygen, as recited in claim 17, wherein said second stream is introduced into said reaction zone at a plurality of points.

22. A process for heating particulate carbonaceous material with oxygen, as recited in claim 17, wherein said period of time is less than about five seconds.

23. A process for heating particulate carbonaceous material with oxygen, as recited in claim 17, wherein said period of time is less than about one second.

24. A process for heating particulate carbonaceous material with oxygen, as recited in claim 17, wherein the carbon monoxide content of said third stream is no greater than about 1.2 times the carbon monoxide content of said first and said second streams.

25. A process for heating particulate carbonaceous material with oxygen, as recited in claim 17, wherein the carbon monoxide content of said third stream is no greater than about 1.1 times the carbon monoxide content of said first and said second streams.

* * * * *